United States Patent
Matsumoto

(10) Patent No.: US 11,945,018 B2
(45) Date of Patent: Apr. 2, 2024

(54) DRILLING PROCESSING METHOD USING PRESS

(71) Applicant: MAZDA MOTOR CORPORATION, Hiroshima (JP)

(72) Inventor: Shigeru Matsumoto, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 359 days.

(21) Appl. No.: 17/537,685

(22) Filed: Nov. 30, 2021

(65) Prior Publication Data

US 2022/0193790 A1    Jun. 23, 2022

(30) Foreign Application Priority Data

Dec. 21, 2020 (JP) ................. 2020-211086

(51) Int. Cl.
*B21D 28/02* (2006.01)
*B23B 35/00* (2006.01)

(52) U.S. Cl.
CPC .............. *B21D 28/02* (2013.01); *B23B 35/00* (2013.01)

(58) Field of Classification Search
CPC ...... B21D 28/24; B21D 28/243; B21D 28/26; B21D 28/32; B21D 53/88
See application file for complete search history.

(56) References Cited

FOREIGN PATENT DOCUMENTS

| CN | 205096352 U | | 3/2016 | |
|---|---|---|---|---|
| JP | S63-041660 B2 | | 8/1988 | |
| JP | H0549128 U | * | 6/1993 | ............. B21D 28/32 |
| JP | 09010860 A | * | 1/1997 | ............. B21D 28/24 |
| JP | H09-10860 A | | 1/1997 | |
| JP | H11169966 A | * | 6/1999 | ............. B21D 28/24 |
| JP | 2001-179357 A | | 7/2001 | |
| JP | 2001179357 A | * | 7/2001 | ............. B21D 28/10 |
| JP | 5837711 B1 | | 12/2015 | |
| JP | 2016-190279 A | | 11/2016 | |
| WO | WO-2010039150 A1 | * | 4/2010 | ............. B21D 28/26 |

* cited by examiner

*Primary Examiner* — Bobby Yeonjin Kim
(74) *Attorney, Agent, or Firm* — Studebaker & Brackett PC

(57) ABSTRACT

In drilling processing on a press-formed inclined portion, a hole is formed with high precision without occurrence of damage to a blade of a punch or slipping of the punch. Embodiments include a method where two through holes are formed in a blank before press-forming which are opposed to each other in the inclined direction of the inclined portion, each through portion partially forming a peripheral edge portion of the hole. The inclined portion is formed using press processing on the blank. Piercing processing using a punch is performed while pressing the inclined portion, so that the two opposed through holes are connected, thereby forming the hole.

12 Claims, 8 Drawing Sheets

DRILLING PROCESSING METHOD USING PRESS

TECHNICAL FIELD

The present disclosure relates to a drilling processing method using a press.

BACKGROUND ART

Typically, in press processing, a pierced hole is provided in an inclined portion inclined with respect to the press direction. For example, Japanese Patent Publication No. 63-041660 discloses a technique in which a pierced hole is formed by performing piercing processing with respect to a blank, and then a part having the pierced hole is inclined with respect to a peripheral portion using press processing. Japanese Patent Laid-Open No. 09-10860 discloses a technique in which an upper die is lowered with respect to a blank to form an inclined portion using press bending processing, and further a blanking punch is lowered in this state to form a pierced hole in the inclined portion.

Japanese Patent Laid-Open No. 2001-179357 discloses a technique in which, in press cutting processing of a contour of a product from a blank, a micro joint connecting a blank body and the product is left so that the product is not separated during the processing, and thereafter the micro joint is cut to obtain the product.

As in Japanese Patent Laid-Open No. 09-10860, in the case where an upper die is lowered to form an inclined portion using press bending processing, and subsequently a blanking punch is lowered to form a pierced hole, the punch is applied not in a direction orthogonal to the inclined portion but in a direction oblique to the inclined portion. Therefore, there is a concern that damage to a blade of the punch (breakage of the blade), slipping of the punch, or a failure of drilling may occur during drilling.

In contrast, in so-called "cam piercing," a cam is incorporated between the upper die and the punch so that when the upper die is lowered, the traveling direction of the punch is made orthogonal to the inclined portion by the cam. This method does not cause a slip of the punch, but does not necessarily prevent damage to the blade of the punch. In particular, in the case where the blank is a high tensile steel plate, the problem of damage to the blade is considerable. Furthermore, in cam piercing, the die structure is more complicated and the cost of the die is higher.

The present disclosure provides a method to form a hole with high precision in drilling processing on an inclined portion using a press, without damage to a blade of a punch and slipping of the punch.

SUMMARY

In order to solve the above problems, according to the present disclosure, a through portion that partially forms a peripheral edge portion of a hole to be formed is provided in a blank before press processing.

A drilling processing method using a press disclosed herein is a method for forming an inclined portion inclined with respect to a press direction using press processing on a blank, and forming a hole in the inclined portion, and the method comprises:

forming at least two through portions in the blank which are opposed to each other in an inclined direction of the inclined portion, each of the through portions partially forming a peripheral edge portion of the hole, forming the inclined portion using the press processing on the blank, and performing piercing processing using a punch while pressing the inclined portion so that the at least two opposed through portions are connected, thereby forming the hole.

According to this method, in the piercing processing on the inclined portion, the two through portions that form the peripheral edge portion of the hole to be formed are already provided, and thus resistance at the time of punching the inclined portion is small. Therefore, even in the case where the blank is made of a material having high strength such as high tensile steel, damage to a blade of the punch hardly occurs.

Furthermore, the two through portions are opposed to each other in the inclined direction of the inclined portion, and thus resistance applied to parts of the punch which are opposed to each other in the inclined direction is small. Accordingly, even when the punch is advanced in the press direction at the time of forming the inclined portion, slipping of the punch at the inclined portion is prevented, and in the case of adopting a cam piercing method, slipping of the punch hardly occurs even when the punch is not necessarily applied orthogonally to the inclined portion.

Therefore, according to the present disclosure, a necessary hole can be formed in the inclined portion with high shape precision.

In one embodiment, in the piercing processing, the punch is advanced in the press direction for the blank at the time of forming the inclined portion.

Accordingly, it is not necessary to incorporate a cam mechanism into a die for the piercing processing on the inclined portion. Therefore, complication of the die structure and an increase in the die cost are avoided.

The through portion may be a slit which is formed using cutting processing and extends along a peripheral edge of the hole to be formed, or a through hole formed using piercing processing. In the case of the through hole, different from the slit, occurrence of a crack from the through hole toward the periphery is avoided in the subsequent piercing processing using the punch.

In one embodiment, the through portion is formed simultaneously with blanking. Although the through portion can be formed after blanking, the integration of the processes in which the through portion is formed simultaneously with blanking provides the advantages of enhancing productivity and processing precision.

In one embodiment, the blank is made of a high tensile steel plate. In a blank made of a high tensile steel plate having a tensile strength of 590 MPa or more or further 1180 MPa or more, damage of the blade of the punch and slipping of the punch as described above commonly occur, whereas the present disclosure advantageously prevents these problems from occurring.

According to the present disclosure, since the at least two through portions opposed to each other in the inclined direction of the inclined portion to be press-formed are formed in the blank in advance, the inclined portion is formed using press processing on the blank, and thereafter the piercing processing using the punch is performed so that the at least two opposed through portions are connected, a hole with high shape precision can be formed without occurrence of damage to the blade of the punch and slipping of the punch.

DETAILED DESCRIPTION

Hereinafter, a mode for carrying out the present disclosure will be described based on the drawings. The following description of one embodiment is merely illustrative in nature and is not intended to limit the present disclosure, applications thereof, or use thereof.

Press-Formed Product

Figure 1:
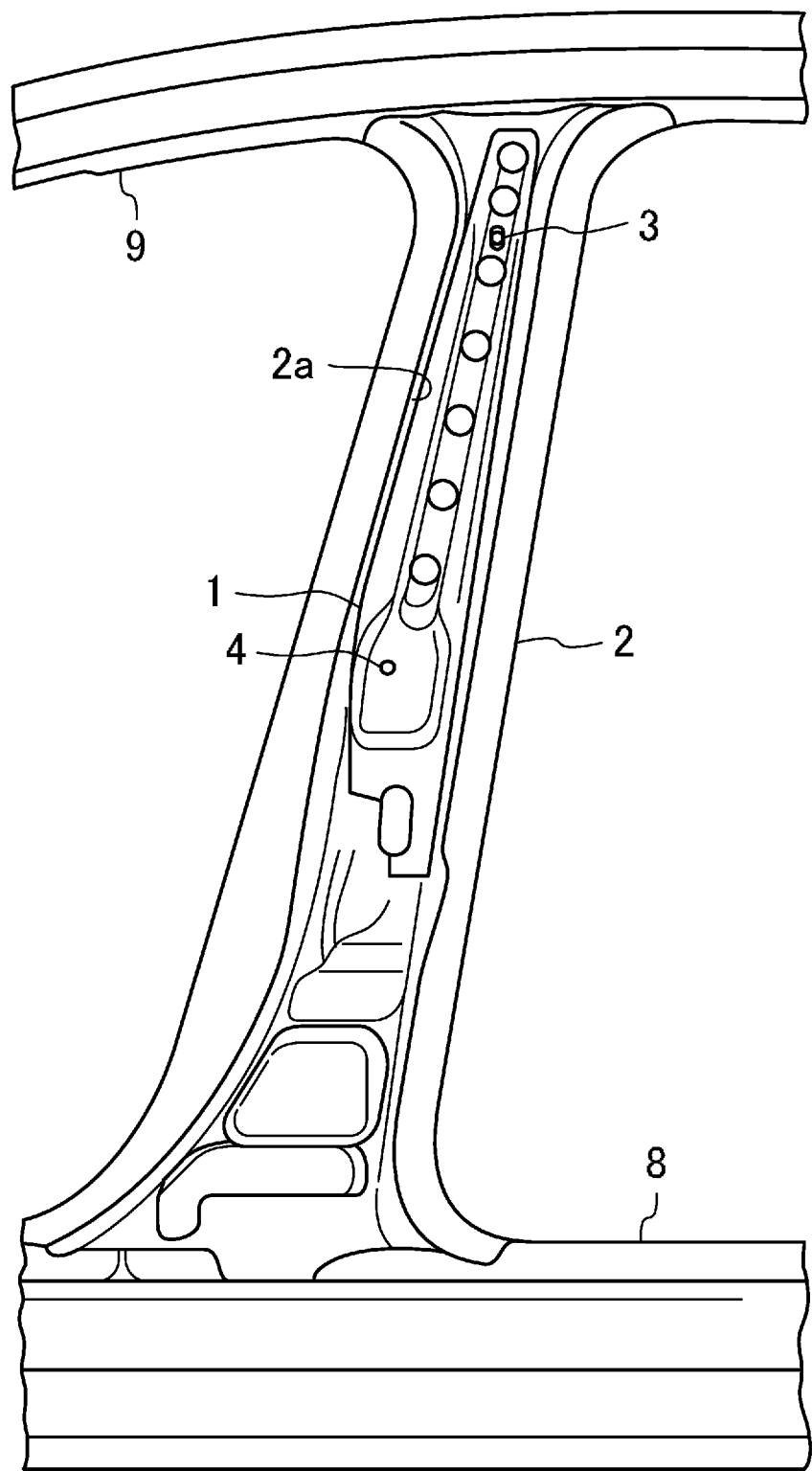
FIG. 1 is a front view of a press-formed product according to the present disclosure assembled to a vehicle body frame.
Figure 2:
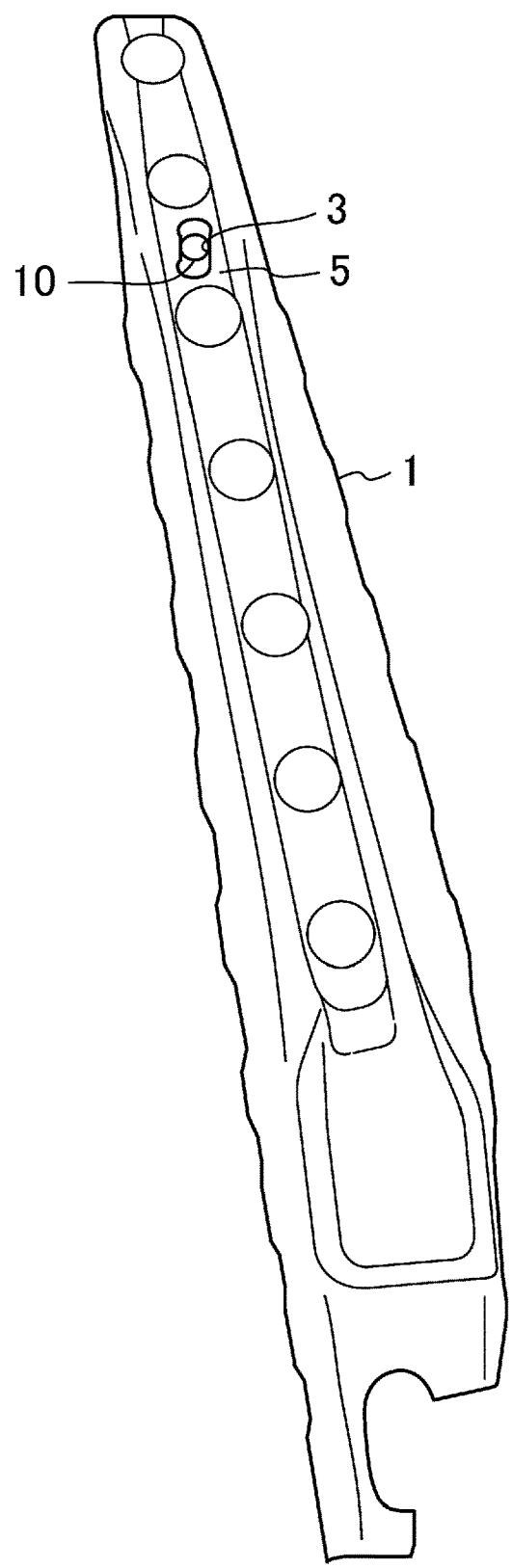
FIG. 2 is a front view of the press-formed product.
Figure 3:
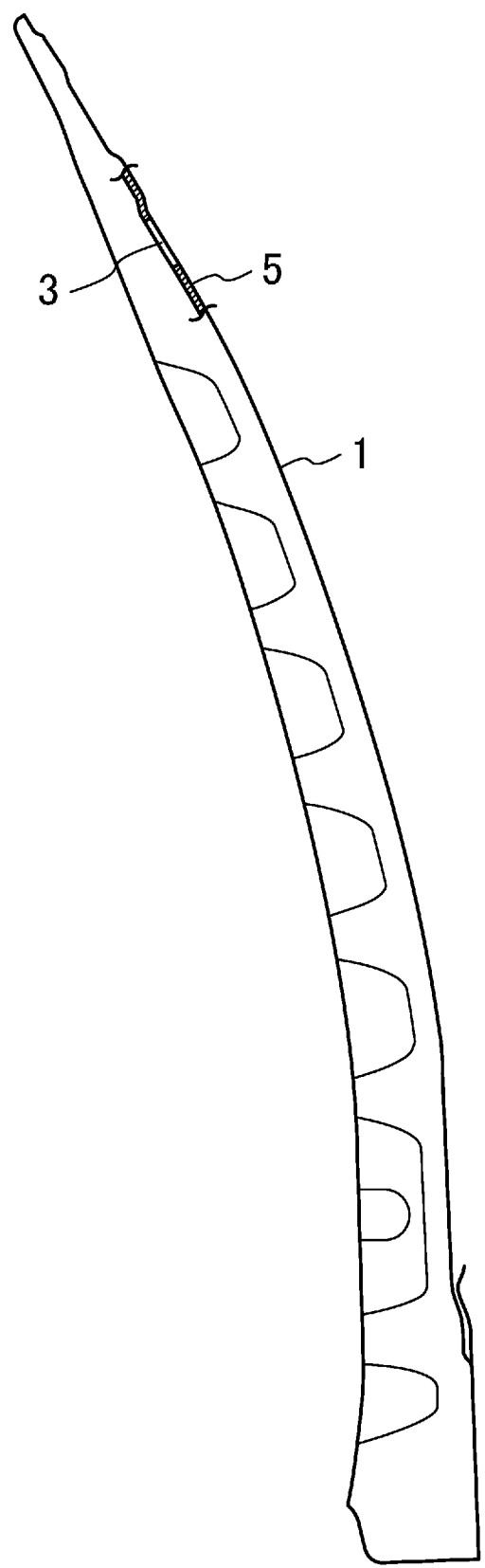
FIG. 3 is a side view of the press-formed product.

In the present embodiment, a formed product 1 made of steel illustrated in FIGS. 1 to 3 is obtained by press processing. As illustrated in FIG. 1, the press-formed product 1 is an inner reinforcement of a B pillar which is located between a front seat of an automobile and a rear seat thereof and extends from a side sill 8 to a roof rail 9, and is made of high tensile steel. Although not illustrated in the figure, the B pillar includes an outer panel and an inner panel, and the formed product (inner reinforcement) 1 and an outer reinforcement 2 are provided between these two panels as illustrated in FIG. 3. Note that FIG. 1 is a view when the formed product 1 and the like are viewed from the vehicle body inner side, whereas FIG. 3 is a view when the formed product is viewed from the vehicle body outer side.

An upper end of the outer reinforcement 2 is joined to the roof rail 9, and a lower end of the outer reinforcement 2 is joined to the side sill 8. The formed product 1 is fitted to a recess 2a extending in the up-down direction of the outer reinforcement 2 and is superimposed on the outer reinforcement 2. The formed product 1 reinforces a part from a door hinge of the B pillar to around the roof rail 9 for countermeasures for side collision of the automobile.

The formed product 1 is sub-assembled to the outer reinforcement 2. Two positioning pins are provided in a positioning jig for this, and positioning holes 3 and 4 into which the positioning pins fit are formed in an upper portion of the formed product 1 and a lower portion of the formed product 1. By insertion of the positioning pin into the lower positioning hole 4, relative positioning of the formed product 1 with respect to the outer reinforcement 2 in the up-down direction and the vehicle body front-rear direction is made. By insertion of a positioning pin 10 into the upper positioning hole 3, positioning of the formed product 1 with respect to the outer reinforcement 2 is made so that the formed product 1 does not rotate using the positioning pin of the lower positioning hole 4 as an axis.

Figure 4:
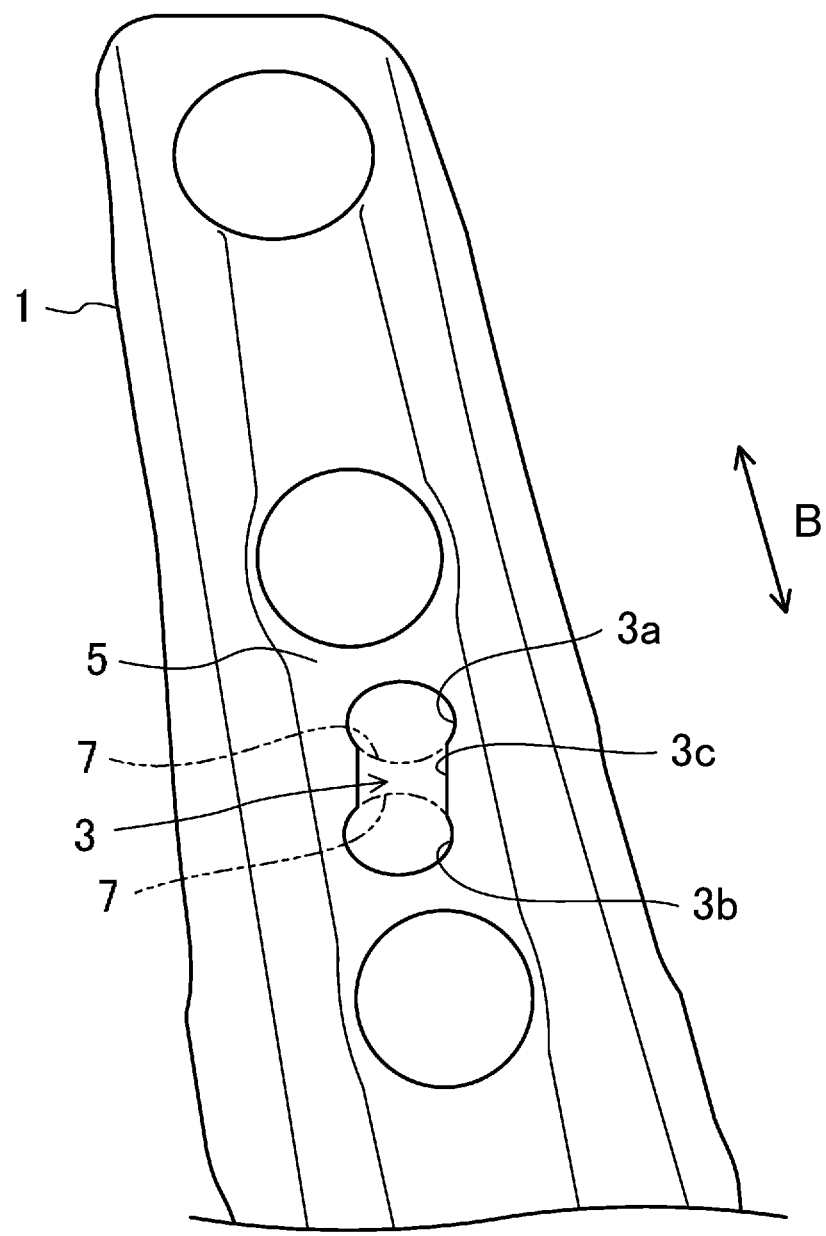
FIG. 4 is a partially enlarged front view of the press-formed product.

As illustrated in FIG. 4, the positioning hole 3 of the formed product 1 has, so to speak, a gourd shape in which upper and lower round hole portions 3a and 3b are connected by an intermediate slot portion 3c extending in the up-down direction. As described above, the positioning hole 3 is for positioning in the rotational direction, and thus shape precision of both side edges of the intermediate slot portion 3c against which the positioning pin 10 abuts is important.

The positioning hole 3 is formed in an inclined portion 5 having an aspect of being inclined with respect to a press direction A (see FIG. 6) at the time of press processing of the formed product 1, which will be clarified later in a description of a press-forming apparatus.

Forming of Press-Formed Product

Figure 5:
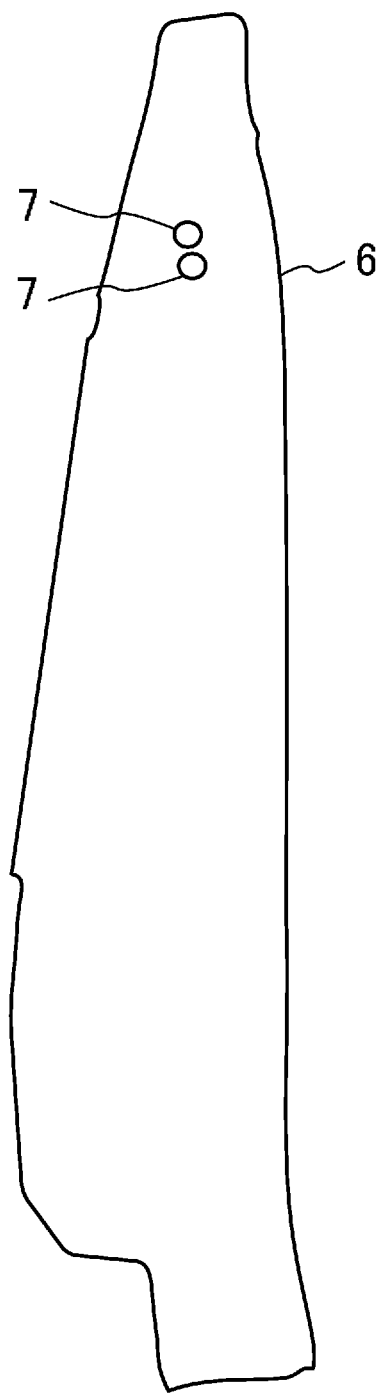
FIG. 5 is a front view of a blank.

FIG. 5 illustrates a blank 6 obtained from a high tensile steel plate by blanking. In a section of the blank 6 in which the positioning hole 3 is to be formed, two through holes 7 (through portions referred to in the present disclosure) are formed so as to be spaced apart from each other in the longitudinal direction of the blank 6. One through hole 7 forms an upper half peripheral edge portion of the upper-side round hole portion 3a of the positioning hole 3 illustrated in FIG. 4, and the other through hole 7 forms a lower half peripheral edge portion of the lower-side round hole portion 3b. The two through holes 7 are opposed to each other in an inclined direction B of the inclined portion 5. The through holes 7 are formed using a punch simultaneously with the blanking of the steel plate. In the blanking and the drilling using the punch, the high tensile steel plate is punched in a direction orthogonal to a plate surface thereof.

Subsequently, the blank 6 with the through holes 7 formed therein is formed into the shape of the formed product 1 using press processing, and the positioning hole 3 is formed.

Figure 6:
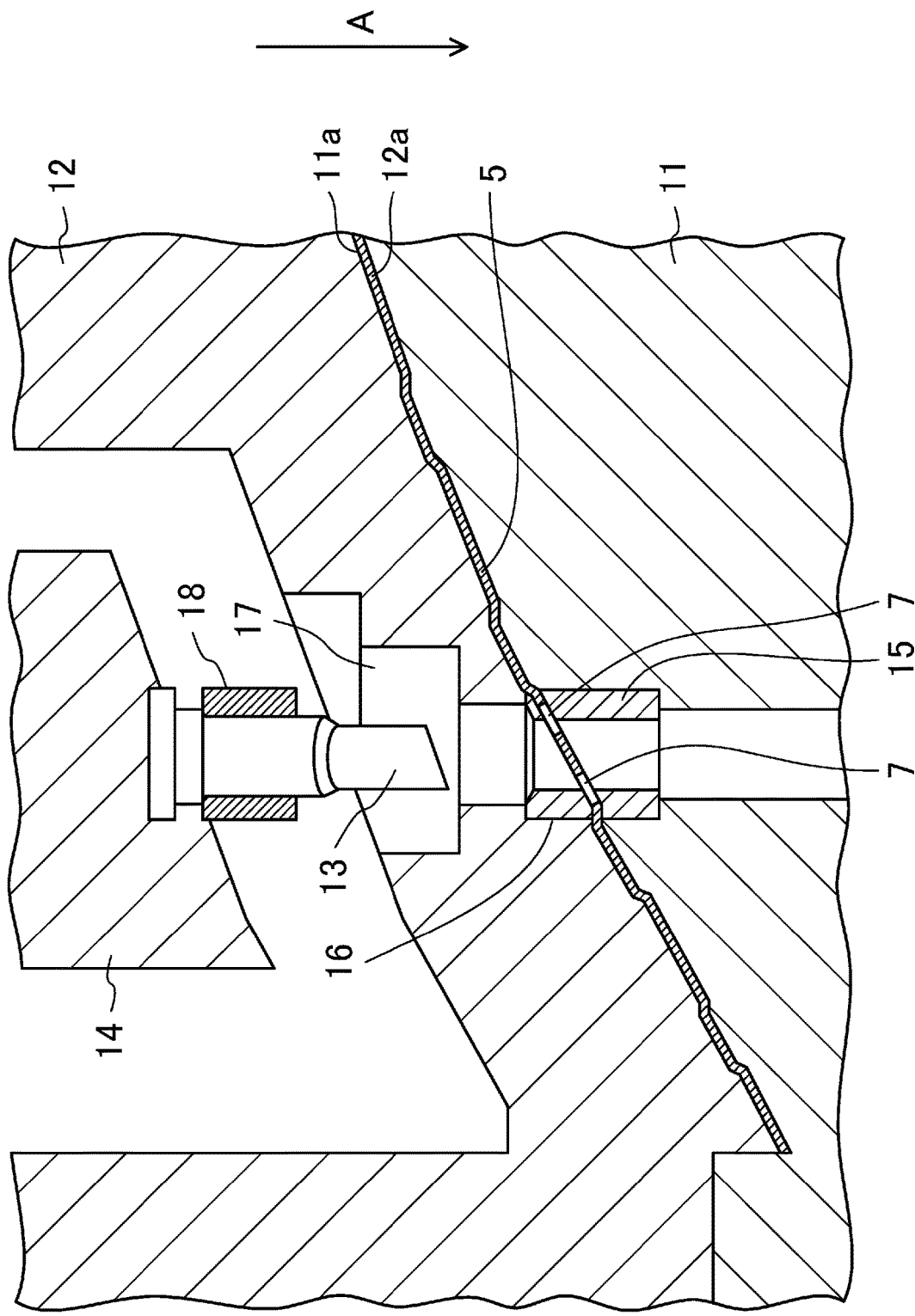
FIG. 6 is a cross-sectional view of a press-forming apparatus.

FIG. 6 illustrates the press-forming apparatus. In the figure, reference numeral 11 denotes a lower die for press-forming, reference numeral 12 denotes an upper die for press-forming, reference numeral 13 denotes a punch for forming the positioning hole 3, and reference numeral 14 denotes a punch holder that fixes the punch 13 to an upper die plate (not illustrated in the figure).

The up-down direction in the figure is a direction in which the upper die 12 is lifted and lowered, and accordingly arrow A is the press direction. A hydraulic cylinder that lowers the upper die 12 in the press direction A prior to the punch 13 (or an elastic member that elastically biases the upper die 12 in the press direction A) is provided between the upper die plate and the upper die 12. The upper die plate is attached to a slider of a press machine which is lifted and lowered.

As apparent from the above description, in the press-forming apparatus, the punch 13 is advanced (lowered) in the press direction A by movement (lowering) of the slider of the press machine in the press direction A, and no cam for piercing is provided.

Forming faces 11a and 12a for forming the formed product 1 from the blank 6 are formed on the lower face side of the lower die 11 and the upper face side of the upper die 12. The forming faces 11a and 12a of parts of the lower die 11 and the upper die 12 illustrated in the figure are inclined with respect to the press direction A, and the inclined portion 5 of the formed product 1 is formed by the forming faces 11a and 12a.

The lower die 11 includes a die 15 open to the forming face 11a of the lower die 11. The die 15 is provided at a position corresponding to the punch 13, and an upper face of the die 15 is flush with the forming face 11a. The upper die 12 includes an inclined portion presser 16 having a punch hole open to the lower side at a section corresponding to the die of the lower die 11. A lower face of the inclined portion presser 16 is flush with the forming face 12a.

A punch receiving recess 17 is provided on the upper face side of the lower die 11. A cushion member 18 that hits against a bottom of the recess 17 is fitted to the punch 13.

Figure 7:
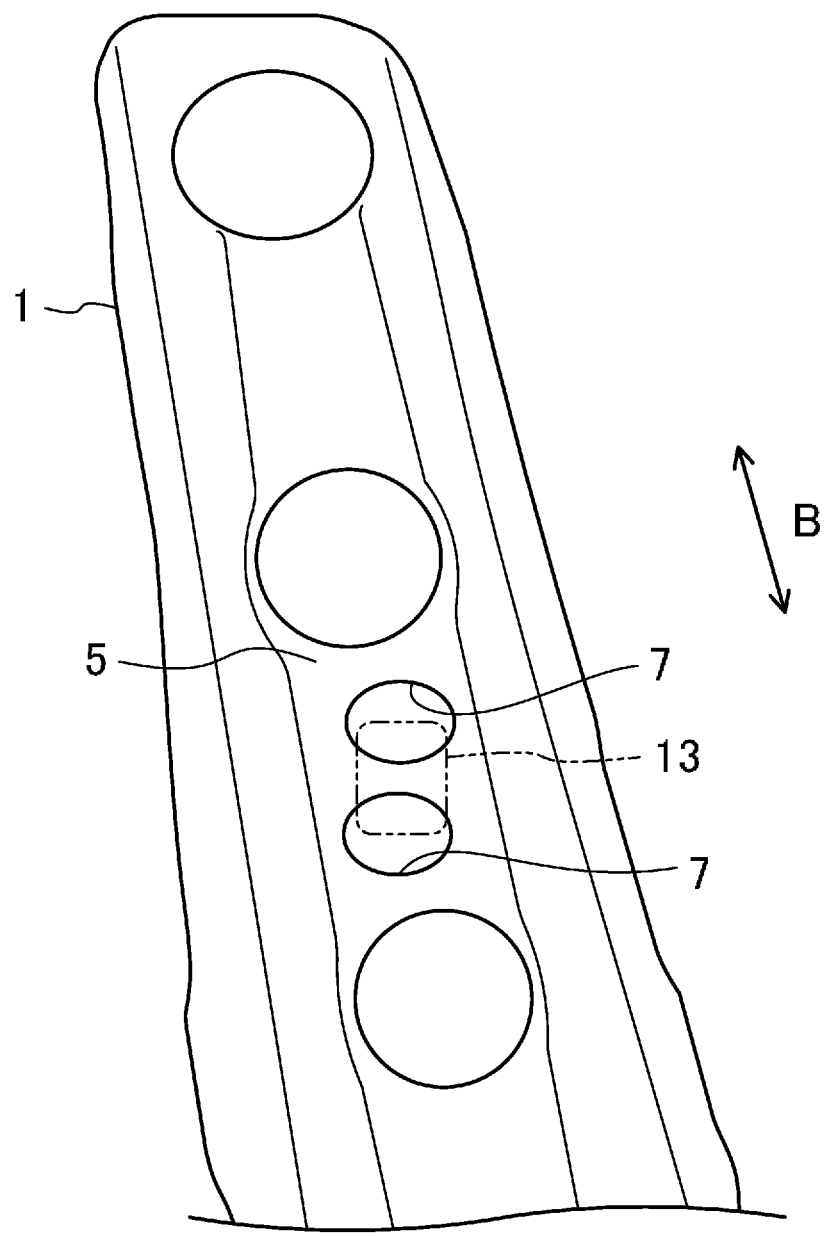
FIG. 7 is a front view of the press-formed product before piercing processing.

In the press-forming apparatus, the blank 6 is positioned over the lower die 11, and the press machine is activated to lower the upper die plate. Thus, the upper die 12 is lowered prior to the punch 13. The blank 6 is pressed between the forming face 11a of the lower die 11 and the forming face 12a of the upper die 12 and formed into the shape of the formed product illustrated in FIGS. 1 and 2. That is, as illustrated in FIG. 7, the inclined portion 5 is formed which has an aspect in which the two through holes 7 drilled in advance are opposed to each other in the inclined direction B.

Subsequently, the punch 13 is lowered in the press direction of the upper die 12 to punch a space between the two through holes of the inclined portion 5. As indicated by a chain line in FIG. 7, the punch 13 is a cornered punch provided so as to be astride the two through holes 7. The punching of the space between both through holes 7 using the punch 13 forms the positioning hole 3 in which the upper and lower round hole portions 3a and 3b derived from the through holes 7 illustrated in FIG. 4 are connected by the slot portion 3c.

Piercing processing using the punch 13 is drilling of the inclined portion 5, and as described above, the punch 13 is advanced so as to be astride the two through holes 7 and the space between both through holes 7 is punched. Accordingly, resistance at the time of the punching is small. In particular, both through holes 7 are opposed to each other in the inclined direction of the inclined portion 5, and thus resistance applied to parts of the punch 13 which are opposed to each other in the inclined direction is small.

Therefore, even in the case where the blank 6 is made of a material having high strength such as high tensile steel, slipping of the punch 13 and damage to a blade of the punch 13 hardly occur, and the slot portion 3c corresponding to the cross-sectional shape of the punch 13 can be formed with high precision.

Here, the round hole portions 3a and 3b are derived from the through holes 7 formed in the blank 6 in advance, and thus the shapes or positions of the round hole portions 3a and 3b somewhat change due to elongation of the material at the time of the press-forming of the inclined portion 5. However, the slot portion 3c is formed using the punching after the press-forming of the inclined portion 5, and thus the slot portion 3c is not affected by the press-forming, so that slipping of the punch 13 and damage to the blade of the punch 13 are avoided as described above, increasing the shape precision of both side edges of the slot portion 3c. As described earlier, both side edges of the slot portion 3c prevent rotational deviation of the formed product 1 through the insertion of the positioning pin, and the high shape precision is advantageous for desired rotational positioning.

Furthermore, in the above embodiment, as described above, the punch 13 is advanced in the press direction for the reason that even when the punch 13 is applied to the inclined portion 5 at an acute angle, slipping of the punch 13 and damage to a blade of the punch 13 do not occur. That is, it is not necessary to advance the punch 13 orthogonally to the inclined portion 5 using a cam mechanism. Accordingly, complication of the die structure and an increase in the die cost due to incorporation of the cam mechanism are avoided.

Figure 8A:
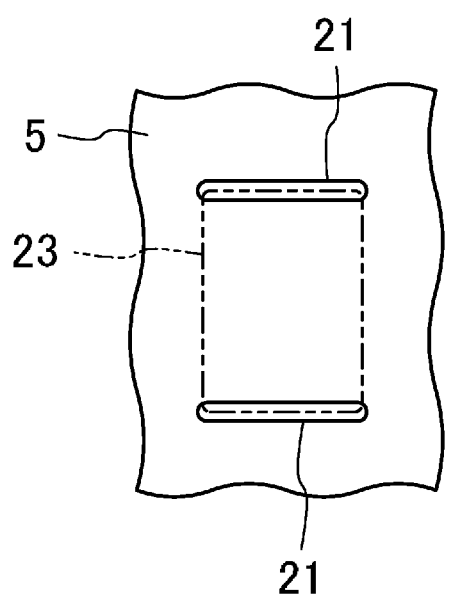
FIGS. 8A and 8B are explanatory views of another embodiment of the present disclosure.
Figure 8B:
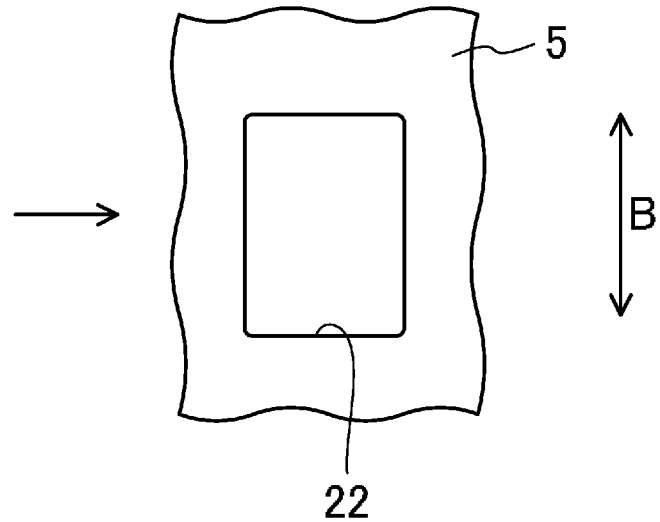

FIGS. 8A and 8B are explanatory views of another embodiment of the present disclosure. In the previous embodiment, the through portions opposed to each other in the inclined direction of the inclined portion 5 are through holes formed using piercing processing. In the embodiment of FIGS. 8A-8B, the through portions provided in the blank 6 are slits 21 formed using cutting processing as illustrated in FIG. 8A, and a rectangular hole 22 is formed in the inclined portion 5 as illustrated in FIG. 8B. The two slits 21 extend along two opposed side edges of the rectangular hole 22 to be formed (opposed to each other in the inclined direction of the inclined portion 5). After press-forming of a blank having the slits 21, a cornered punch 23 indicated by a chain line in FIG. 8A is advanced so as to be astride both slits 21, and both slits 21 are punched, thereby forming the rectangular hole 22 illustrated in FIG. 8B.

Similarly, in this embodiment, even in the case where the advancing direction of the punch 23 is at an acute angle with respect to the inclined portion 5, the rectangular hole 22 can be formed with high precision without occurrence of a slip of the punch 23 and damage to a blade of the punch 23.

Note that the shape of the hole formed in the inclined portion is not limited to the example of each of the above-described embodiments, and a circular hole or an elliptical hole may be provided. In the case where the through portion is a slit, the slit is not limited to a straight slit and may be an arc slit.

Furthermore, although in each of the above embodiments, two through portions opposed to each other in the inclined direction are provided, one through portion may be provided on one of the sides opposed to each other in the inclined direction and a plurality of through portions may be provided side by side on the other side along a peripheral edge of the hole to be formed, or a plurality of through portions may be provided side by side on each of both sides.

Furthermore, the present disclosure does not exclude cam driving of the punch. For example, in the case where an inclination angle with respect to the press direction A of the inclined portion 5 (an inclination angle based on the case of being orthogonal to the press direction A) is large, a cam may be used. Even in such a case, it is not necessary to change the advancing direction of the punch to a direction orthogonal to the inclined portion using the cam. That is, it is not necessary to increase the changing angle of the punch advancing direction using the cam, and accordingly it is advantageous for smooth activation of the cam.

Furthermore, the present disclosure is not limited to a high tensile steel plate and, of course, can be applied to an ordinary steel plate or another metal plate.

What is claimed is:

1. A drilling processing method using a press for forming an inclined portion inclined with respect to a press direction using press processing on a blank, and forming a hole in the inclined portion, the method comprising:
   forming at least two through portions in the blank which are opposed to each other in an inclined direction of the inclined portion, each of the through portions partially forming a peripheral edge portion of the hole;
   forming the inclined portion using the press processing on the blank; and
   performing piercing processing using a punch while pressing the inclined portion so that the at least two opposed through portions are connected, thereby forming the hole.

2. The drilling processing method using the press according to claim 1, wherein in the piercing processing, the punch is advanced in the press direction for the blank when forming the inclined portion.

3. The drilling processing method using the press according to claim 2, wherein each through portion is a through hole formed using piercing processing.

4. The drilling processing method using the press according to claim 2, wherein the through portions are formed simultaneously with the blank.

5. The drilling processing method using the press according to claim 2, wherein the blank comprises a high tensile steel plate.

6. The drilling processing method using the press according to claim 1, wherein each through portion is a through hole formed using piercing processing.

7. The drilling processing method using the press according to claim 1, wherein the through portions are formed simultaneously with the blank.

8. The drilling processing method using the press according to claim 1, wherein the blank comprises a high tensile steel plate.

9. The drilling processing method using the press according to claim 1, comprising forming the hole using a press-forming apparatus including a lower die for press-forming, an upper die for press-forming, the punch, and a punch holder that fixes the punch to an upper die plate.

10. The drilling processing method using the press according to claim 9, wherein a lower face side of the lower die has a lower forming face for forming a formed product including the inclined portion from the blank, and an upper face side of the upper die has an upper forming face for forming the formed product, and wherein the lower forming face and the upper forming face are each inclined with respect to the press direction such that the inclined portion is formed by the lower forming face and the upper forming face.

11. The drilling processing method using the press according to claim 1, wherein the punch is a cornered punch disposed between the opposed through portions, such that punching of the space between the opposed through portions using the punch forms the hole, and the hole has upper and lower hole portions derived from the opposed through portions and connected by a slot portion.

12. The drilling processing method using the press according to claim 1, comprising forming, from the blank, a steel inner reinforcement of a B pillar which is located between a front seat of an automobile and a rear seat thereof and extends from a side sill to a roof rail.

* * * * *